(12) United States Patent
Nakamura

(10) Patent No.: US 8,047,943 B2
(45) Date of Patent: Nov. 1, 2011

(54) REDUCTION GEAR TRANSMISSION

(75) Inventor: Koji Nakamura, Tsu (JP)

(73) Assignee: Nabtesco Corporation, Tokyo (JP)

( * ) Notice: Subject to any disclaimer, the term of this patent is extended or adjusted under 35 U.S.C. 154(b) by 473 days.

(21) Appl. No.: 12/310,387

(22) PCT Filed: Sep. 26, 2007

(86) PCT No.: PCT/JP2007/068716
§ 371 (c)(1),
(2), (4) Date: Feb. 24, 2009

(87) PCT Pub. No.: WO2008/038680
PCT Pub. Date: Apr. 3, 2008

(65) Prior Publication Data
US 2010/0009801 A1 Jan. 14, 2010

(30) Foreign Application Priority Data
Sep. 29, 2006 (JP) .................. 2006-268655

(51) Int. Cl.
F16H 1/32 (2006.01)
(52) U.S. Cl. ..................................... 475/178
(58) Field of Classification Search .......... None
See application file for complete search history.

(56) References Cited

FOREIGN PATENT DOCUMENTS

| JP | U-59-3048 | 1/1984 |
|---|---|---|
| JP | U-62-24157 | 2/1987 |
| JP | A-63-243547 | 10/1988 |
| JP | U-4-48450 | 4/1992 |
| JP | A-9-57678 | 3/1997 |
| JP | A-2006-22829 | 1/2006 |

OTHER PUBLICATIONS

Chinese Office Action dated Sep. 21, 2010 in corresponding Chinese Patent Application No. 200780035728.6 (with translation).
Supplementary European Search Report for corresponding European Patent Application No. 07828462.7, mailed on Jan. 26, 2011.

Primary Examiner — Dirk Wright
(74) Attorney, Agent, or Firm — Oliff & Berridge, PLC

(57) ABSTRACT

A reduction gear transmission, a kind of eccentrically-oscillating-type reduction gear transmission, is provided with an internal gear, an external gear, a carrier, a crank member and a bearing mechanism. The external gear comprises a through hole at a position offset from its central axis. The carrier comprises a support shaft that extends into the through hole of the external gear. The crank member comprises a though hole into which the support shaft extends and an eccentric member that engages inside the through hole of the external gear. The central axis of the eccentric member is offset from a central axis of the support shaft. The bearing is disposed between the support shaft and the crank member, and supports the crank member such that the crank member is capable of rotating with respect to the central axis of the support shaft. In this reduction gear transmission, a clearance that extends along the support shaft between the carrier and the inner ring is narrower than a clearance between the carrier and an end face of the crank member.

6 Claims, 8 Drawing Sheets

REDUCTION GEAR TRANSMISSION

FIELD OF THE INVENTION

This application claims priority to Japanese Patent Application No. 2006-268655, filed on Sep. 29, 2006, the contents of which are hereby incorporated by reference into the present application.

The present invention relates to a reduction gear transmission utilized in an industrial robot or a machine tool, etc. In particular, the present invention relates to a reduction gear transmission that is a kind of eccentrically oscillating type reduction gear transmission.

BACKGROUND OF THE INVENTION

In preparing an internal gear and an external gear, the external gear rotates with respect to the internal gear when the external gear is caused to revolve orbitally around a central axis of the internal gear while the two are maintaining a meshed state. An eccentrically oscillating type of reduction gear transmission that utilizes this phenomenon has been developed, and such is taught, for example, in Japanese Patent Application Publication No. 1997-57678. This type of reduction gear transmission comprises an internal gear, an external gear, a carrier, a crankshaft, and a bearing.

The external gear rotates while revolving orbitally around the central axis of the internal gear while maintaining a meshed state with the internal gear. A plurality of through holes formed at positions offset from the center are formed in the external gear. The carrier is supported so as to be capable of rotating around the central axis of the internal gear. The crankshaft is attached to the carrier in a manner that allows the rotation of the crankshaft. The crankshaft comprises a shaft part and an eccentric member that has a central axis formed in a position offset from a central axis of the shaft part. The eccentric member of the crankshaft engages with the through hole of the external gear. The bearing is disposed between the carrier and the shaft part of the crankshaft, and supports the shaft part of the crankshaft such that it can rotate with respect to the carrier.

In the configuration described above, when the crankshaft is rotated by a motor, the eccentric member of the crankshaft rotates eccentrically. When the eccentric member of the crankshaft rotates eccentrically, the external gear rotates while revolving orbitally around the central axis of the internal gear. When the external gear rotates, the carrier rotates with respect to the internal gear. The rotation of the crankshaft can be transmitted to the rotation of the carrier, and the number of rotations of the carrier can be reduced compared to the number of rotations of the crankshaft.

In the eccentrically oscillating type reduction gear transmission, the crankshaft must be provided such that it can rotate with respect to the carrier. For example, in the reduction gear transmission of Japanese Patent Application Publication No. 1997-57678, the shaft part of the crankshaft is supported by a tapered roller bearing, and the crankshaft is thus supported such that it can rotate with respect to the carrier.

DISCLOSURE OF THE INVENTION

Problem to be Solved by the Invention

In a conventional reduction gear transmission, the shaft part is formed on the crankshaft, and this shaft part is supported by the bearing. The shaft part of the crankshaft extends from the eccentric member towards both sides in the rotation axis direction of the crankshaft, and consequently the length of the crankshaft in its rotation axis direction is increased. As a result, the length of the reduction gear transmission in its rotation axis direction is increased.

The present invention solves the above problem. The present invention teaches a technique that decreases the length of the reduction gear transmission in its rotation axis direction.

Means to Solve the Problem

A reduction gear transmission of the present invention comprises at least an internal gear, an external gear, a carrier, a crank member, and a bearing mechanism. The external gear comprises a through hole at a position offset from its central axis, wherein the external gear is supported such that the external gear is capable of rotating on its central axis while revolving with respect to a central axis of the internal gear while maintaining a meshed state with the internal gear. The carrier comprises a support shaft that extends into the through hole of the external gear. The carrier is supported such that the carrier is capable of rotating with respect to the central axis of the internal gear. The crank member comprises a though hole into which the support shaft extends and an eccentric member that engages inside the through hole of the external gear. A central axis of the eccentric member is offset from a central axis of the support shaft. The bearing mechanism comprises an inner ring into which the support shaft of the carrier fits and an outer ring that fits into the through hole of the crank member. The bearing mechanism supports the crank member such that the crank member is capable of rotating with respect to the central axis of the support shaft. In this reduction gear transmission, a clearance that extends along the support shaft between the carrier and the inner ring is narrower than a clearance that extends along the support shaft between the carrier and an end face of the crank member.

The term that "the clearance between the carrier and the inner ring being narrower than the clearance between the carrier and the crank member" also includes the case in which a clearance is not present between the carrier and the inner ring.

In this reduction gear transmission, the bearing mechanism is provided between the crank member and the support shaft formed on the carrier, and the crank member is supported so as to be capable of rotating with respect to the support shaft. The crank member thus no longer needs to be provided with a shaft part specifically for mounting the bearing mechanism. It is possible to reduce the size of the reduction gear transmission in its rotation axis direction by reducing the length of the crank member in its rotation axis direction.

When the bearing mechanism is disposed between the support shaft and the crank member and the length of the reduction gear transmission in its rotation axis direction is reduced, it may no longer be possible to maintain an adequate clearance between the crank member and the carrier (a clearance extending in the rotation axis direction). Under such a circumstance, the crank member and the carrier may make contact if the crank member moves even slightly in the axial direction of the support shaft. In such a case, it consequently becomes necessary to prevent the bearing mechanism that is supporting the crank member from moving in the axial direction of the support shaft so as to prevent the crank member from moving in the axial direction of the support shaft.

In the reduction gear transmission of the present invention, the clearance that extends along the support shaft between the carrier and the inner ring of the bearing mechanism is narrower than the clearance between the carrier and the end face of the crank member. The clearance between the crank member and the carrier can thus be maintained even in the case where the bearing mechanism has moved to its maximum extent in the axial direction of the support shaft.

According to this reduction gear transmission, it is possible to reliably prevent the crank member and the carrier from making contact, and the length of the reduction gear transmission in its rotation axis direction can be significantly reduced.

It is preferred that, in this reduction gear transmission, a spacer member is disposed between the carrier and the bearing mechanism.

By using the spacer member, it is possible to adjust the clearance extending along the support shaft between the carrier and the inner ring of the bearing mechanism. The clearance extending along the support shaft between the carrier and the inner ring of the bearing mechanism can reliably be made narrower than the clearance between the carrier and the end face of the crank member.

Alternatively, it is preferred that the carrier comprises a protrusion that protrudes along the support shaft and toward the inner ring of the bearing mechanism.

It is thereby possible to reliably make the clearance extending along the support shaft between the carrier and the inner ring of the bearing mechanism narrower than the clearance between the carrier and the crank member without using the spacer member, or by using the protrusion in combination with the spacer member.

Alternatively, it is preferred that the inner ring of the bearing mechanism comprises a protrusion that protrudes along the support shaft and toward the carrier.

It is thereby possible to reliably make the clearance extending along the support shaft between the carrier and the inner ring of the bearing mechanism narrower than the clearance between the carrier and the crank member without using the spacer member, or by using the protrusion that protrudes toward the carrier in combination with the spacer member.

In this reduction gear transmission, it is preferred that the support shaft comprises an expanded portion at which the diameter of the support shaft is expanded. The support shaft is partially composed of the expanded portion along its axial direction, and the bearing mechanism comprises a pair of bearings. In this case, it is preferred that the expanded portion of the support shaft is disposed between the pair of bearings.

In this reduction gear transmission, the bearing mechanisms are prevented from moving in the axial direction of the support shaft by the expanded portion of the support shaft. The bearing mechanisms can be maintained correctly in position by the spacer member, etc. and the expanded portion of the support shaft.

In this reduction gear transmission, it is preferred that the pair of bearings is a pair of tapered roller bearings.

It is thereby possible to prevent the crank member from moving in the axial direction of the support shaft. The clearance between the crank member and the carrier can be made comparatively small, and the size of the reduction gear transmission in its rotation axis direction can be further reduced.

Effect of the Invention

According to the reduction gear transmission of the present invention, the length of the reduction gear transmission in its rotation axis direction can be reduced and, for example, a joint part of an industrial robot can be configured in a compact manner.

PREFERRED EMBODIMENTS OF THE INVENTION

Preferred Features of the Embodiments of the Invention are listed below (Feature 1) The reduction gear transmission comprises a pair of external gears. The pair of external gears has a phase difference of 180 degrees with respect to each other, and rotates while revolving orbitally around a central axis of an internal gear.

(Feature 2) The carrier comprises a pair of sheet shaped parts disposed at both ends (one each) in the rotation axis direction of the external gear, and a plurality of columnar parts that extends between the pair of sheet shaped parts.

(Feature 3) A plurality of support shafts is formed on the carrier. The plurality of support shafts extends between the pair of sheet shaped parts of the carrier. The plurality of support shafts is disposed equidistantly in a circumferential direction.

(Feature 4) A pair of eccentric members is formed on the crank member. The central axis of one of the pair of eccentric members and the central axis of the other of the pair of eccentric members are offset from the central axis of the support shaft in opposing directions with respect to each other. One of the pair of eccentric members fits into a through hole formed in one of the pair of external gears. The other of the pair of eccentric members fits into a through hole formed in the other of the pair of external gears. The pair of eccentric members thus rotates eccentrically with a phase difference of 180 degrees therebetween and following the rotation of the crank member, and the pair of external gears rotates while revolving orbitally around the central axis of the internal gear with a mutual phase difference of 180 degrees.

(Feature 5) At least a part of a bearing mechanism disposed between a support shaft and a through hole of the crank member is positioned within the range of the length in the axial direction where the eccentric member of the crank member is formed.

EMBODIMENTS OF THE INVENTION

Embodiment 1

Figure 1:
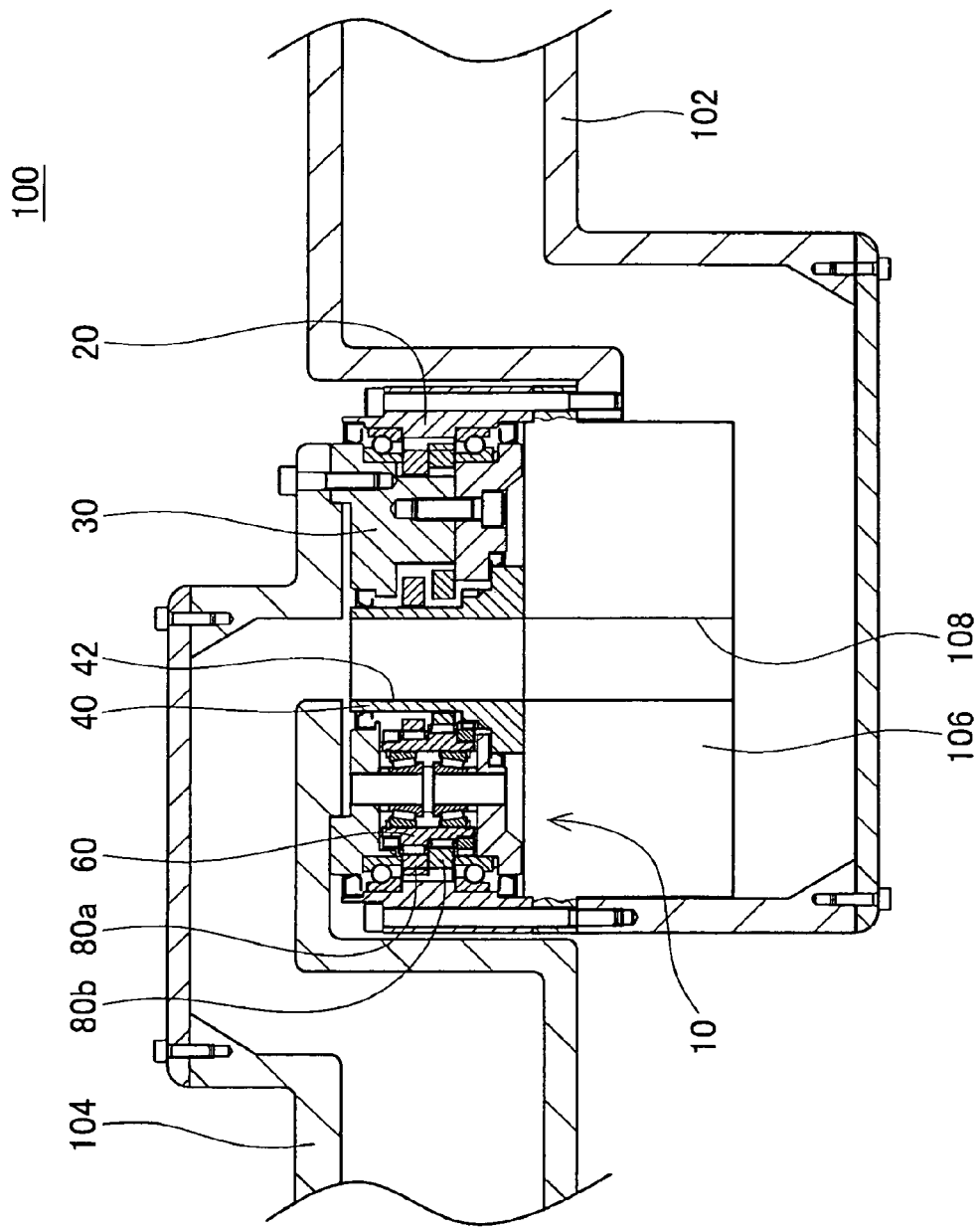
FIG. 1 shows a joint part utilizing a reduction gear transmission of an embodiment 1.

FIG. 1 shows a reduction gear transmission 10 in which the present invention has been realized. As shown in FIG. 1, the reduction gear transmission 10 can be suitably used in, for example, a joint part 100 of an industrial robot. The joint part 100 comprises a first arm 102, a second arm 104, the reduction gear transmission 10, and a motor 106. The second arm 104 is connected via the reduction gear transmission 10 to the first arm 102 in a manner capable of swinging. The reduction gear transmission 10 also has a hollow structure having a central hole 42. Further, the motor 106 has a hollow structure having a central hole 108. The central hole 42 of the reduction gear transmission 10 and the central hole 108 of the motor 106 communicate with one another, and electrical wiring, etc. can be disposed from the first arm 102 side to the second arm 104 side through these central holes 42 and 108.

The reduction gear transmission 10 comprises an internal gear 20, a carrier 30, an input shaft 40, three crank members 60, and a pair of external gears 80a and 80b. The internal gear 20 is fixed, together with the motor 106, to the first arm 102. The carrier 30 is fixed to the second arm 104. The input shaft 40 is fixed to an output shaft (not shown) of the motor 106. In the reduction gear transmission 10, when the input shaft 40 is rotated by the motor 106, the pair of external gears 80a and 80b rotates while revolving orbitally with respect to the internal gear 20, and the carrier 30 rotates with respect to the internal gear 20. In this occasion, the speed of rotation of the motor 106 is reduced, that is, the rotary torque of the motor 106 is amplified. The second arm 104 thereby swings with respect to the first arm 102 at low speed and high torque.

Figure 2:
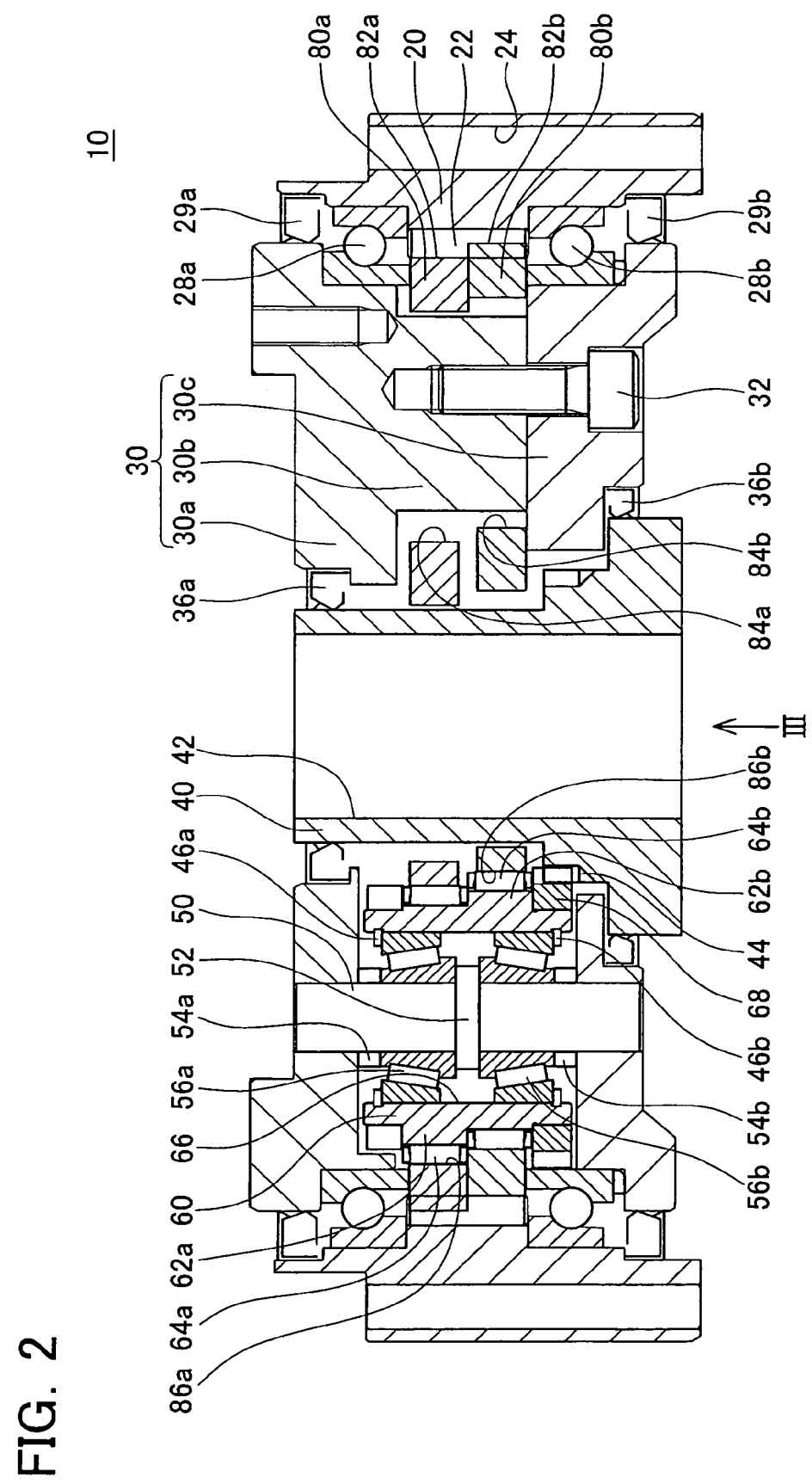
FIG. 2 shows a cross-sectional view of the reduction gear transmission of embodiment 1.
Figure 3:
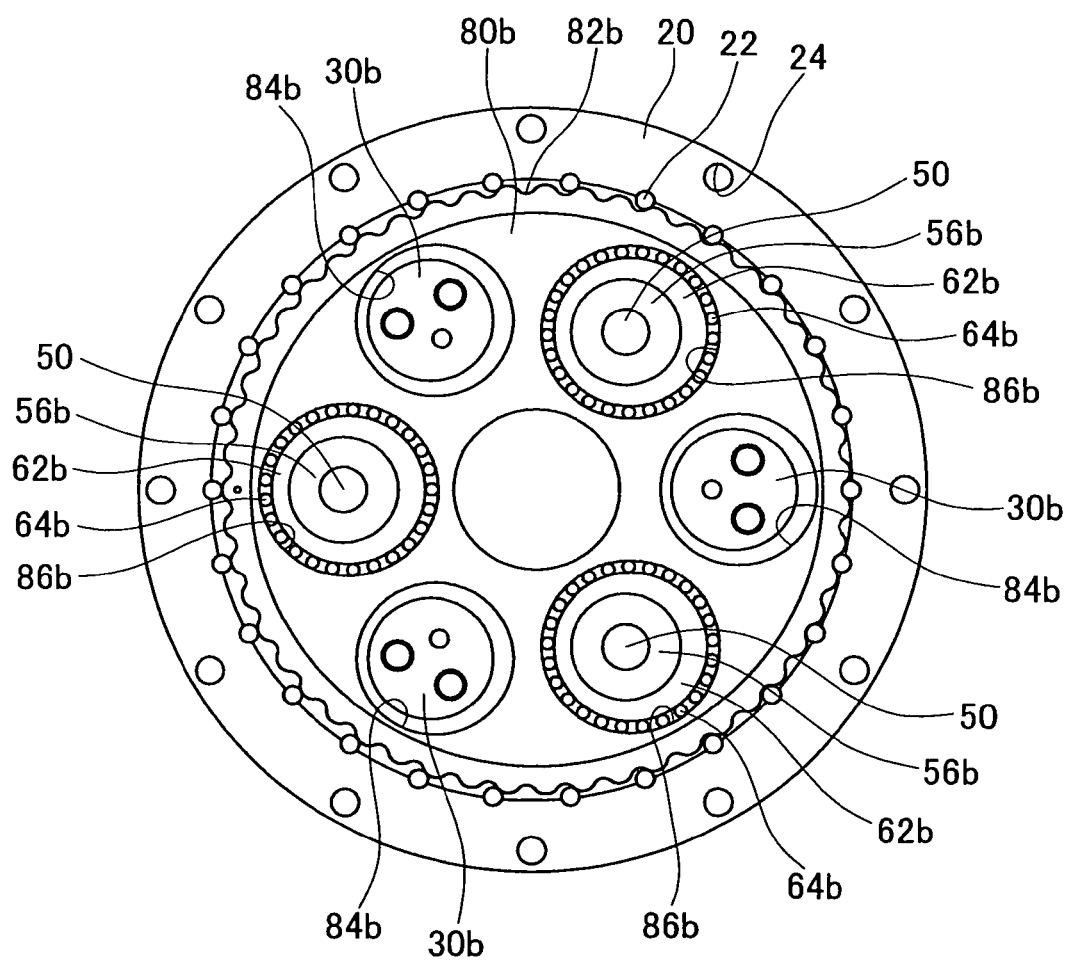
FIG. 3 shows a plan view of the reduction gear transmission of embodiment 1 (viewed in the direction of the arrow III of FIG. 2).

FIG. 2 shows the configuration of the reduction gear transmission 10. FIG. 3 shows a plan view viewed in the direction of the arrow III of FIG. 2. Moreover, in order to clearly show the configuration of the external gear 80b, etc., a state is shown in which parts of the carrier 30 and the input shaft 40, etc. have been removed. The configuration of the reduction gear transmission 10 will be described in detail with reference to FIGS. 2 and 3.

The internal gear 20 has a cylindrical shape. A plurality of pins 22 is disposed equidistantly along an inner circumferential surface of the internal gear 20. The internal gear 20 is an internal gear type pin gear. A plurality of holes 24 is formed in the internal gear 20. These holes 24 allow the passage of bolts or the like used for fixing.

The pair of external gears 80a and 80b has an identical shape. The external gears 80a and 80b are approximately disc shaped. Gear parts 82a and 82b that mesh with the gear pins 22 of the internal gear 20 are formed along an outer circumferential surface of the external gears 80a and 80b. The following are formed in the external gears 80a and 80b: three pairs of carrier through holes 84a and 84b, and three pairs of crank through holes 86a and 86b. Below, the external gear 80a that is positioned at an upper side in FIG. 2 will be termed "a first external gear 80a", and the external gear 80b that is positioned at a lower side in FIG. 2 will be termed "a second external gear 80b".

The carrier 30 comprises a pair of sheet shaped parts 30a and 30c that faces one another, and three columnar members 30b that extend between the pair of sheet shaped parts 30a and 30c. The pair of sheet shaped parts 30a and 30c is positioned at each of the ends in an axial direction of the pair of external gears 80a and 80b. That is, the external gears 80a and 80b of the pair have a positional relationship such that they are housed between the pair of sheet shaped parts 30a and 30c. The three columnar members 30b are disposed equidistantly along a circumferential direction. The carrier 30 has a configuration in which the pair of sheet shaped parts 30a and 30c is joined by the plurality of columnar members 30b. Moreover, one of the sheet shaped parts 30a (at the upper side in FIG. 2) is formed integrally with the three columnar members 30b, and the other of the sheet shaped parts 30c (at the lower side in FIG. 2) is fixed to the columnar members 30b by a plurality of bolts 32. Below, the sheet shaped part 30a positioned at the upper side in FIG. 2 may be termed "a first sheet shaped part 30a", and the sheet shaped part 30c positioned at the lower side in FIG. 2 may be termed "a second sheet shaped part 30c".

The columnar members 30b pass through the carrier through holes 84a and 84b of the external gears 80a and 80b. A clearance is formed between each of the columnar members 30b and the respective carrier through holes 84a and 84b, this clearance allows the external gears 80a and 80b to rotate eccentrically (revolve orbitally) with respect to the carrier 30.

Further, three support shafts 50 are formed on the carrier 30. One end part (at the upper side in FIG. 2) of the support shafts 50 is fixed to the first sheet shaped part 30a, and the other end part (at the lower side in FIG. 2) of the support shafts 50 is fixed to the second sheet shaped part 30c. That is, the support shafts 50 extend between the pair of sheet shaped parts 30a and 30c of the carrier 30. The support shafts 50 pass through the crank through holes 86a and 86b of the external gears 80a and 80b. An expanded portion 52 in which the diameter of the support shaft 50 is configured greater than the remaining portion is formed at a central part in an axial direction of the support shafts 50.

The carrier 30 is attached to the internal gear 20 via a pair of angular ball bearings 28a and 28b. The carrier 30 is supported so as to be capable of rotating with respect to the internal gear 20. Oil seals 29a and 29b are formed between the carrier 30 and the internal gear 20.

The crank members 60 are attached to the support shafts 50 via a pair of tapered roller bearings 56a and 56b. The crank members 60 each has an approximately cylindrical shape, and the pair of tapered roller bearings 56a and 56b are housed within through holes 66 of the crank members 60. The pair of tapered roller bearings 56a and 56b allows the respective crank member 60 to rotate around the respective support shaft 50 and prevents the crank member 60 from moving in the axial direction of the respective support shaft 50. The expanded portion 52 of the respective support shafts 50 is disposed between the pair of tapered roller bearings 56a and 56b. Stopping rings 46a and 46b for preventing removal are attached inside the through holes 66 of the crank members 60. Below, the tapered roller bearing 56a positioned at the upper side in FIG. 2 may be termed "a first tapered roller bearing 56a", and the tapered roller bearing 56b positioned at the lower side in FIG. 2 may be termed "a second tapered roller bearing 56b".

A pair of eccentric members 62a and 62b and a follower gear 68 are formed on each of the crank members 60. The eccentric members 62a and 62b are disc shaped, and their respective central axis thereof is offset in a radial direction from a rotation central axis (i.e. a central axis of the support shaft 50) of the crank member 60. The first eccentric member 62a (at the upper side in FIG. 2) and the second eccentric member 62b (at the lower side in FIG. 2) are offset in opposing directions with respect to each other, and the two rotate eccentrically with a phase difference of 180 degrees. The first eccentric member 62a fits into the crank through hole 86a of the first external gear 80a via a needle shaped roller bearing 64a. The second eccentric member 62b fits into the crank through hole 86b of the second external gear 80b via a needle shaped roller bearing 64b. The first external gear 80a and the second external gear 80b are thereby driven by the rotation of the crank member 60 to rotate eccentrically with a phase difference of 180 degrees. The eccentric rotation caused by the crank member 60 causes the first external gear 80a and the second external gear 80b to rotate while revolving orbitally with respect to the internal gear 20 while maintaining a meshed state with the internal gear 20.

At least a part of the tapered roller bearings 56a or 56b being the pair thereof is positioned within the range of the length in the axial direction in which the eccentric members 62a and 62b of the crank member 60 are formed. The reduction gear transmission 10 can thereby be reduced in length in its rotation axis direction; shorter in comparison with a configuration in which, for example, the crank member 60 is supported by a thrust bearing or the like.

The input shaft 40 is provided with a driving gear 44. The driving gear 44 meshes with the follower gears 68 of the crank members 60. Each of the crank members 60 thus rotates when the input shaft 40 rotates. Oil seals 36a and 36b are formed between the input shaft 40 and the carrier 30. The through hole 42 is formed in the input shaft 40, and electrical wiring or the like can be disposed within the through hole 42.

Figure 4:
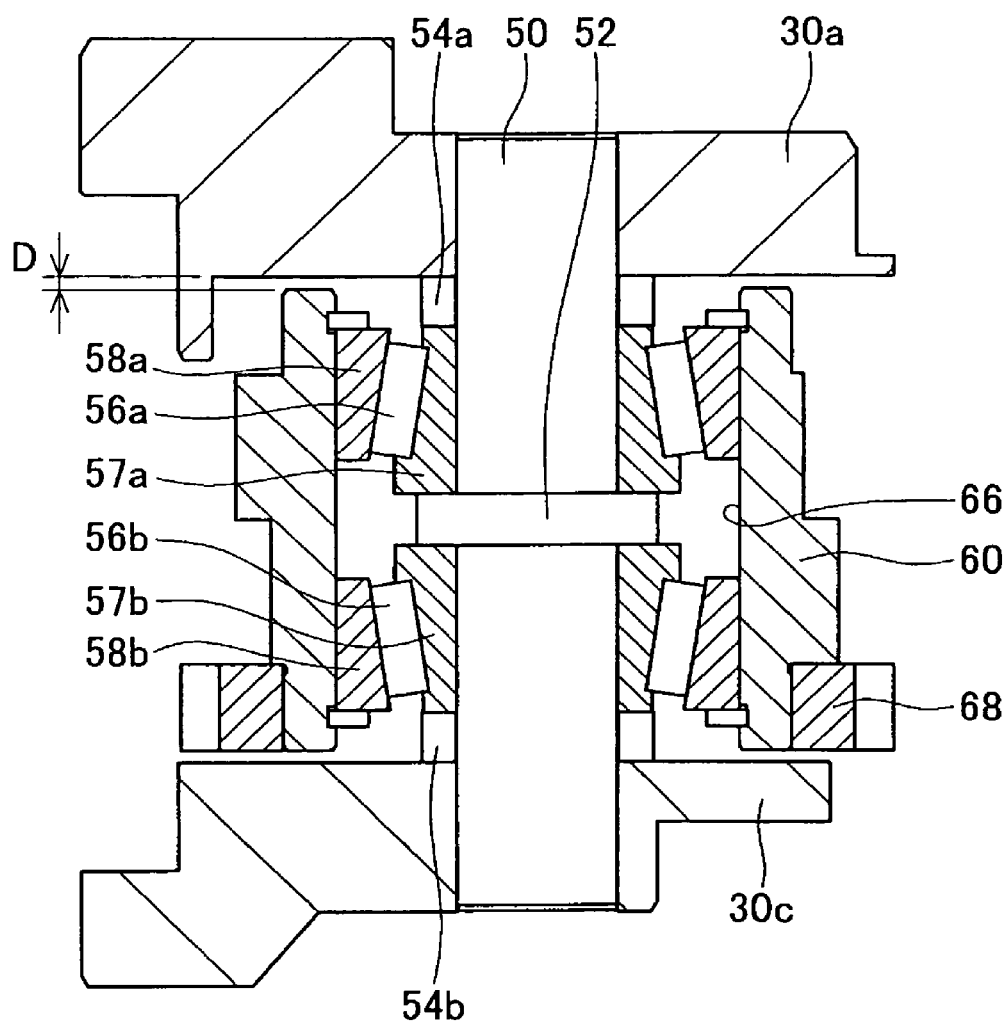
FIG. 4 shows an assembled structure of a crank member of embodiment 1.

FIG. 4 shows an enlargement of an assembly portion of the crank member 60. As shown in FIG. 4, inner rings 57a and 57b of the pair of tapered roller bearings 56a and 56b fit into the support shafts 50, and outer rings 58a and 58b of the pair of tapered roller bearings 56a and 56b fit into the through holes 66 of the crank members 60. A cylindrical spacer 54a is formed between the inner ring 57a of the first tapered roller bearing 56a and the first sheet shaped part 30a of the carrier 30. Similarly, a cylindrical spacer 54b is formed between the inner ring 57b of the second tapered roller bearing 56b and the second sheet shaped part 30c of the carrier 30. A clearance along which the support shaft 50 extends is thus formed between the inner rings 57a and 57b of the tapered roller bearings 56a and 56b and the sheet shaped parts 30a and 30c of the carrier 30. Further, the expanded portion 52 of the support shaft 50 protrudes between the pair of tapered roller bearings 56a and 56b. The inner rings 57a and 57b of the tapered roller bearings 56a and 56b are held by the cylindrical spacers 54a and 54b and the expanded portion 52 of the support shaft 50, thereby preventing the tapered roller bearings 56a and 56b from moving in the axial direction of the support shaft 50. Since the pair of tapered roller bearings 56a and 56b do not move along the support shaft 50, a clearance D (the clearance along a direction which the support shaft 50 extends) is maintained between the crank member 60 and the sheet shaped parts 30a and 30c of the carrier 30. The crank member 60 is prevented from making contact with the sheet shaped parts 30a and 30c of the carrier 30 even if the clearance D between the crank member 60 and the carrier 30 is set to be comparatively narrow. Since the clearance D between the crank member 60 and the carrier 30 can be set to be comparatively narrow, it is possible to decrease the length of the reduction gear transmission 10 in its rotation axis direction.

Figure 5:
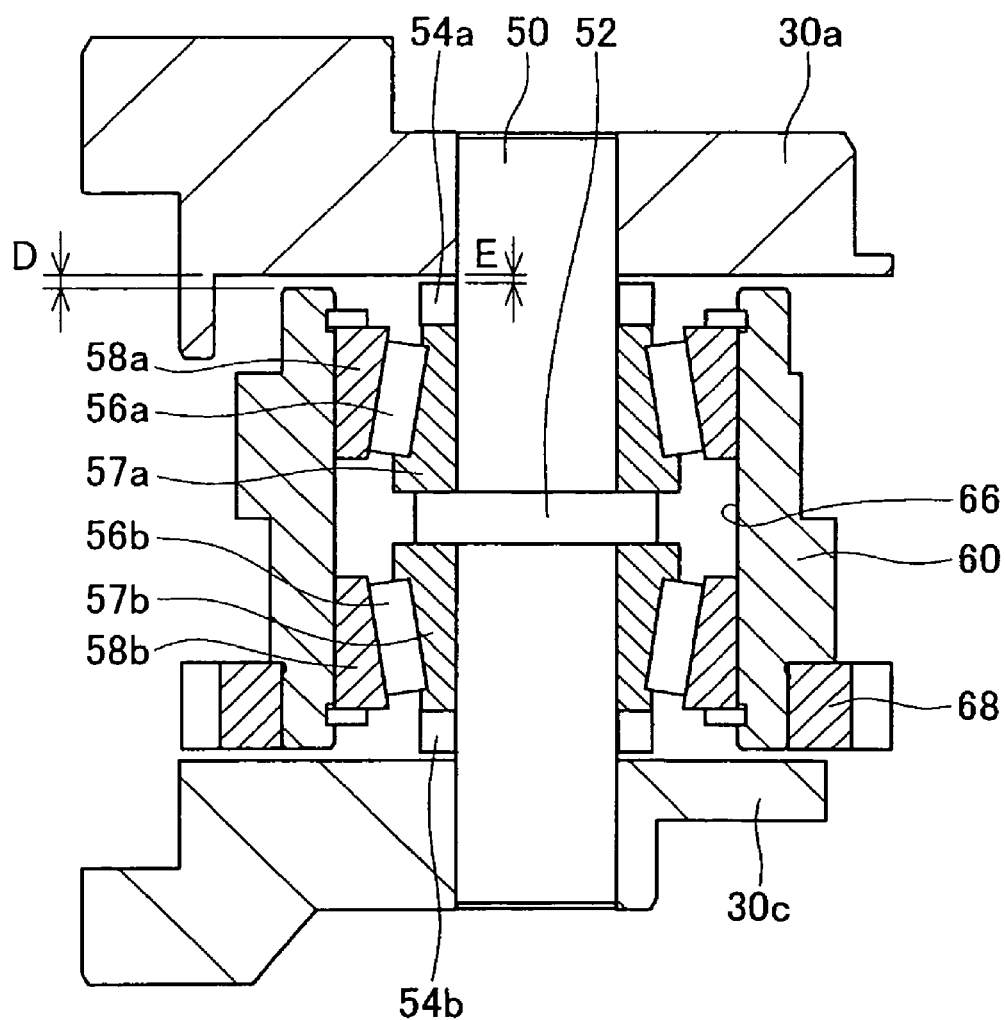
FIG. 5 shows a variant of the assembled structure of the crank member of embodiment 1.

Moreover, a clearance may be formed between the inner rings 57a and 57b of the tapered roller bearings 56a and 56b and the sheet shaped parts 30a and 30c of the carrier 30 based on, for example, allowances that arise due to accuracy of the components or accuracy in assembly. Alternatively, a predetermined clearance may be designed between the inner rings 57a and 57b and the sheet shaped parts 30a and 30c with taking the allowances rising from accuracy of the components or accuracy in assembly into consideration. For example, in the case of the present embodiment, as shown in FIG. 5, a clearance E along a direction which the support shaft 50 extends may be formed between the inner rings 57a and 57b and the sheet shaped parts 30a and 30c by reducing the height to which the cylindrical spacers 54a and 54b rise. In this case, the clearance E that is present between the inner rings 57a and 57b and the sheet shaped parts 30a and 30c must be narrower than the clearance D between the crank member 60 and the sheet shaped parts 30a and 30c of the carrier 30.

Moreover, the present embodiment has a configuration in which the outer rings 58a and 58b of the pair of tapered roller bearings 56a and 56b are completely housed within the through holes 66 of the crank members 60. However, the outer rings 58a and 58b do not necessarily need to be completely housed within the through holes 66 of the crank members 60, and the present embodiment may have a configuration in which a part of the outer rings 58a and 58b is housed within the through holes 66 of the crank members 60. In this case, since the outer rings 58a and 58b protrude from the side face of the crank members 60, the clearance E between the inner rings 57a and 57b and the sheet shaped parts 30a and 30c may be designed narrower than a clearance (a clearance along which the support shaft 50 extends) between the outer rings 58a and 58b and the sheet shaped parts 30a and 30c of the carrier 30.

In the configuration of the present embodiment, the expanded portion 52 of the support shaft 50, and the inner rings 57a and 57b of the tapered roller bearings 56a and 56b are supported by the cylindrical spacers 54a and 54b between the pair of sheet shaped parts 30a and 30c of the carrier 30. The distance between the pair of sheet shaped parts 30a and 30c is thereby maintained even in the case where external force is applied to the pair of sheet shaped parts 30a and 30c, and consequently the crank member 60 is prevented from making contact with the sheet shaped parts 30a and 30c of the carrier 30. Further, the expanded portion 52 of the support shaft 50 is held by the pair of tapered roller bearings 56a and 56b. The support shaft 50 is thereby prevented from moving in an axial direction with respect to the carrier 30, and the support shaft 50 is prevented from falling off the carrier 30.

Next, the operation of the reduction gear transmission 10 will be described. When the input shaft 40 is rotated by the motor 106, the driving gear 44 formed on the input shaft 40 rotates. When the driving gear 44 rotates, the crank member 60 rotates around the support shaft 50 as the follower gear 68 that is meshing with the driving gear 44 rotates. On this occasion, the crank member 60 rotates without making contact with the carrier 30 due to the assembled structure of the crank member shown in FIG. 4. The rotation of the crank member 60 causes the first eccentric member 62a and the second eccentric member 62b of the crank member 60 to rotate eccentrically with the phase difference of 180 degrees. In accordance with the eccentric rotation of the first eccentric member 62a, the first external gear 80a rotates while revolving orbitally around the central axis of the internal gear 20 while maintaining a meshed state with the internal gear 20. Further, in accordance with the eccentric rotation of the second eccentric member 62b, the second external gear 80b rotates while revolving orbitally around the central axis of the internal gear 20 while maintaining a meshed state with the internal gear 20. On this occasion, the first external gear 80a and the second external gear 80b revolve orbitally with the phase difference of 180 degrees. By revolving orbitally while maintaining a meshed state with the internal gear 20, the external gears 80a and 80b also rotate. The ratio of the number of orbital revolutions of the external gears 80a and 80b to the number of rotations is determined by the relationship between the number of teeth of the external gears 80a and 80b and the number of teeth of the internal gear 20. For example, in the case where the difference in number of teeth is one, with the number of teeth of the internal gear 20 being fifty-two and the number of teeth of the external gears 80a and 80b being fifty-one, one rotation of the external gears 80a and 80b is caused by 52 orbital revolutions of the external gears 80a and 80b. As a result, the number of rotations is reduced by 1/52 between the external gears 80a and 80b and the internal gear 20. The carrier 30 is rotated with respect to the internal gear 20 by the rotation of the external gears 80a and 80b. As shown in FIG. 1, the internal gear 20 is fixed to the first arm 102 side, and the carrier 30 is fixed to the second arm 104 side, thus allowing the second arm 104 to swing with respect to the first arm 102.

Embodiment 2

Figure 6:
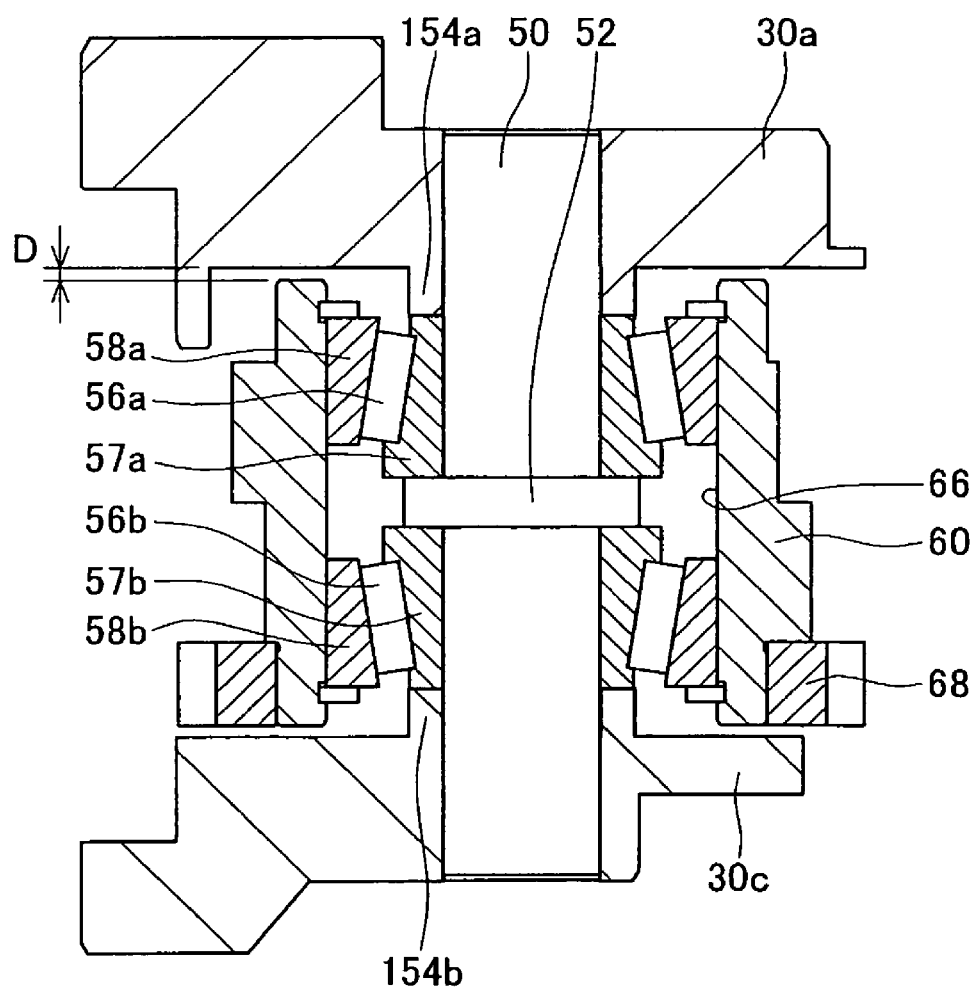
FIG. 6 shows an assembled structure of a crank member of an embodiment 2.

In the present embodiment, a variant will be described of an assembled structure of the crank member 60 within the reduction gear transmission 10 of embodiment 1. FIG. 6 shows the assembled structure of the crank member 60 described in the present embodiment. As shown in FIG. 6, in the assembled structure of the present embodiment, a configuration equivalent to the cylindrical spacers 54a and 54b used in embodiment 1 is formed integrally on the sheet shaped parts 30a and 30c of the carrier 30. That is, protrusions 154a and 154b that protrude along the support shafts 50 toward the tapered roller bearings 56a and 56b are formed on the respective sheet shaped parts 30a and 30c of the carrier 30. The protrusions 154a and 154b can prevent excess space (e.g. greater than the clearance D) from being formed between the inner rings 57a and 57b of the tapered roller bearings 56a and 56b and the sheet shaped parts 30a and 30c of the carrier 30. Like the cylindrical spacers 54a and 54b used in embodiment 1, the protrusions 154a and 154b prevent the tapered roller bearings 56a and 56b from moving in the axial direction of the support shaft 50. According to the configuration of the present embodiment, as well, the crank member 60 can be prevented from making contact with the sheet shaped parts 30a and 30c of the carrier 30. Compared to the configuration of embodiment 1, the number of components can be reduced, and the assembly process of the reduction gear transmission 10 becomes easier.

Embodiment 3

Figure 7:
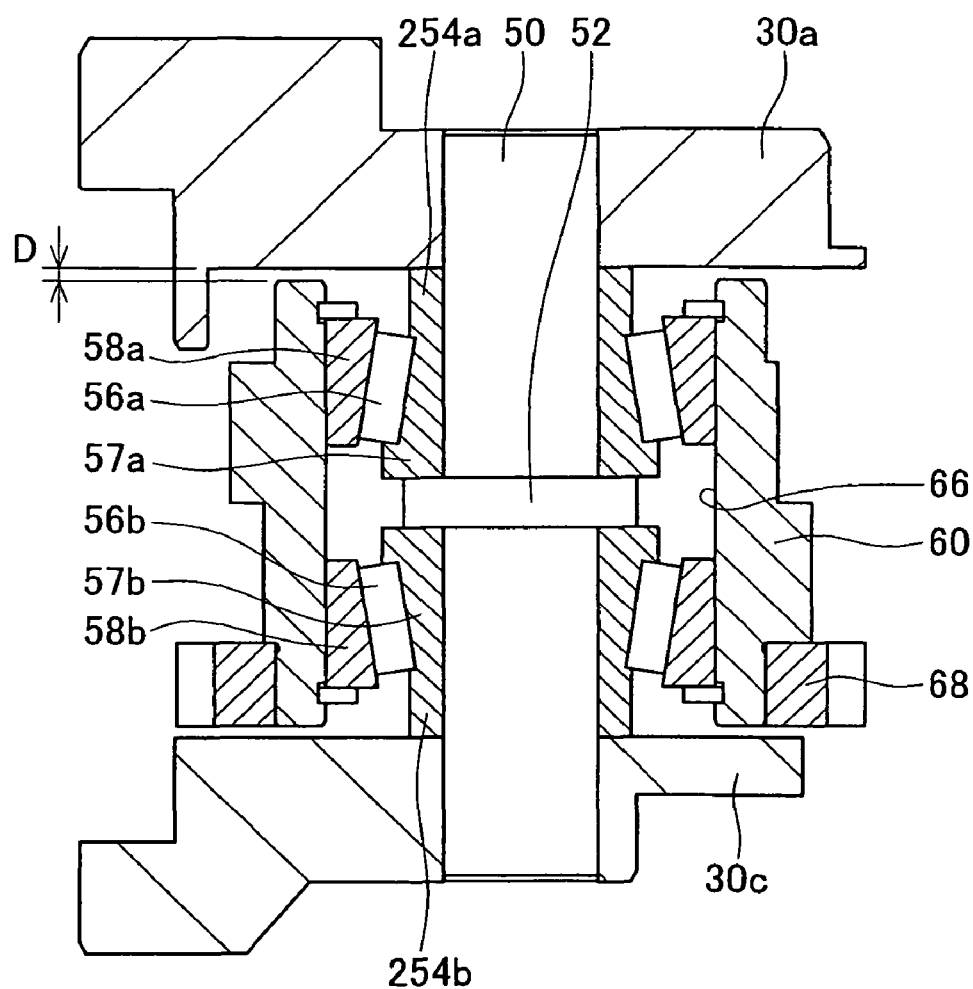
FIG. 7 shows an assembled structure of a crank member of an embodiment 3.

In the present embodiment, another variant will be described of an assembled structure of the crank member 60 within the reduction gear transmission 10 of embodiment 1. FIG. 7 shows the assembled structure of the crank member 60 described in the present embodiment. As shown in FIG. 7, in the assembled structure of the present embodiment, a configuration equivalent to the cylindrical spacers 54a and 54b used in embodiment 1 is formed integrally on the inner rings 57a and 57b of the tapered roller bearings 56a and 56b. That is, protrusions 254a and 254b that protrude along the support shafts 50 toward the sheet shaped parts 30a and 30c of the carrier 30 are formed on the inner rings 57a and 57b of the tapered roller bearings 56a and 56b. The protrusions 254a and 254b can prevent excess space (e.g. greater than the clearance D) from being formed between the inner rings 57a and 57b of the tapered roller bearings 56a and 56b and the sheet shaped parts 30a and 30c of the carrier 30. Like the cylindrical spacers 54a and 54b used in embodiment 1, the protrusions 254a and 254b prevent the tapered roller bearings 56a and 56b from moving in the axial direction of the support shaft 50. According to the configuration of the present embodiment, as well, the crank member 60 can be prevented from making contact with the sheet shaped parts 30a and 30c of the carrier 30. Compared to the configuration of embodiment 1, the number of components can be reduced, and the assembly process of the reduction gear transmission 10 becomes easier.

Embodiment 4

Figure 8:
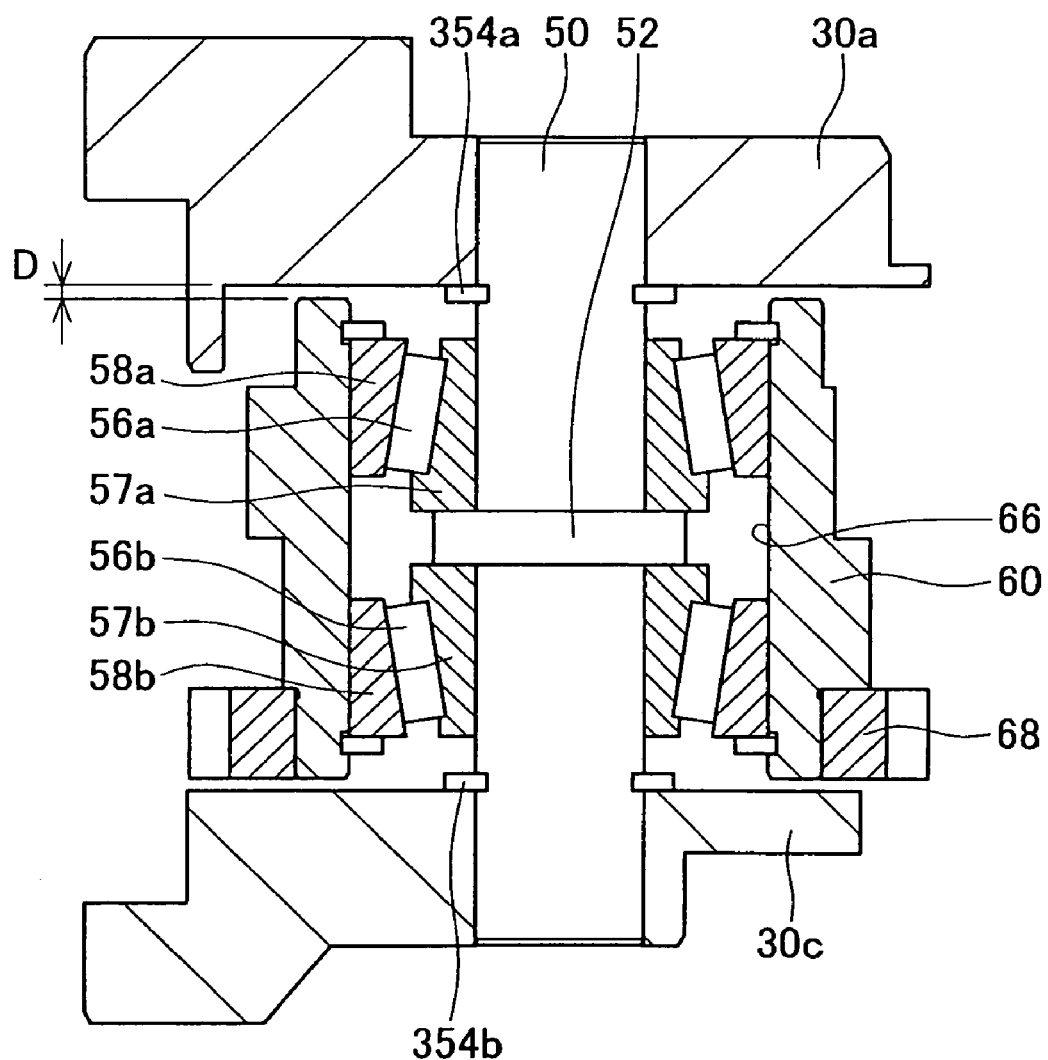
FIG. 8 shows an assembled structure of a crank member of an embodiment 4.

In the present embodiment, yet another variant will be described of an assembled structure of the crank member 60 within the reduction gear transmission 10 of embodiment 1. FIG. 8 shows the assembled structure of the crank member 60 described in the present embodiment. As shown in FIG. 8, in the assembled structure of the present embodiment, instead of the cylindrical spacers 54a and 54b used in embodiment 1, stopping rings 354a and 354b that can each be attached to the support shafts 50 in a manner allowing removal are provided. The stopping rings 354a and 354b can prevent excess space (e.g. greater than the clearance D) from being formed between the inner rings 57a and 57b of the tapered roller bearings 56a and 56b and the sheet shaped parts 30a and 30c of the carrier 30. Moreover, the "space" referred to here means a space (clearance) allowing the tapered roller bearings 56a and 56b to move in the axial direction of the support shaft 50. In the present embodiment, since the tapered roller bearings 56a and 56b are fixed with respect to the support shafts 50, and the tapered roller bearings 56a and 56b move together with the support shafts 50; the "space" in this case refers to a space formed between the stopping rings 354a and 354b and the sheet shaped parts 30a and 30c of the carrier 30. Like the cylindrical spacers 54a and 54b used in embodiment 1, the stopping rings 354a and 354b prevent movement in the axial direction of the support shaft 50, thereby preventing the tapered roller bearings 56a and 56b from moving in the axial direction of the support shaft 50. According to the configuration of the present embodiment, as well, the crank member 60 can be prevented from making contact with the sheet shaped parts 30a and 30c of the carrier 30.

Specific embodiments of the present invention are described above, but these merely illustrate some possibilities of the invention and do not restrict the claims thereof. The art set forth in the claims includes variations and modifications of the specific examples set forth above.

In the embodiments described above, an example of a hollow reduction gear transmission 10 has been described which has a central hole 42. However, the technique described in the present embodiments can also be applied to a reduction gear transmission that is not hollow and does not have a central hole 42.

In the embodiments described above, the columnar members 30b are provided on the carrier 30, and the columnar members 30b pass through the through holes 84a and 84b formed in the external gears 80a and 80b. However, if for example the carrier 30 has a configuration provided with sufficient structural strength, it is not necessary to provide the columnar members 30b on the carrier 30.

In the embodiments described above, three crank members 60 have been utilized. However, the number of crank members 60 is not restricted to three. The number of crank members 60 may be less than three, or may be four or more.

In the embodiments described above, two external gears 80a and 80b have been utilized. However, the number of external gears is not restricted to two. The number of external gears may be one, or may be three or more. If the number of external gears is reduced, the length of the reduction gear transmission in the rotation axis direction can be reduced. If the number of external gears is increased, the rotational balance of the reduction gear transmission improves. The number of external gears can be selected in accordance with the aim and intended use of the reduction gear transmission.

The technical elements disclosed in the specification or the drawings may be utilized separately or in all types of combinations, and are not limited to the combinations set forth in the claims at the time of filing of the application. Furthermore, the art disclosed herein may be utilized to simultaneously achieve a plurality of aims or to achieve one of these aims.

The invention claimed is:

1. A reduction gear transmission comprising:
an internal gear;
an external gear that comprises a through hole at a position offset from its central axis, wherein the external gear is supported such that the external gear is capable of rotating on its central axis while revolving with respect to a central axis of the internal gear and maintaining a meshed state with the internal gear;
a carrier that comprises a support shaft that extends into the through hole of the external gear, wherein the carrier is supported such that the carrier is capable of rotating with respect to the central axis of the internal gear;
a crank member that comprises a though hole into which the support shaft extends and an eccentric member that engages inside the through hole of the external gear, wherein a central axis of the eccentric member is offset from a central axis of the support shaft; and
a bearing mechanism that comprises an inner ring into which the support shaft fits and an outer ring that fits into the through hole of the crank member, wherein the bearing mechanism supports the crank member such that the crank member is capable of rotating with respect to the central axis of the support shaft,
wherein a clearance that extends along the support shaft between the carrier and the inner ring is narrower than a clearance that extends along the support shaft between the carrier and an end face of the crank member.

2. A reduction gear transmission as set forth in claim 1, further comprising a spacer member that is disposed between the carrier and the inner ring.

3. A reduction gear transmission as set forth in claim 1, wherein the carrier comprises a protrusion that protrudes along the support shaft and toward the inner ring.

4. A reduction gear transmission as set forth in claim 1, wherein the inner ring comprises a protrusion that protrudes along the support shaft and toward the carrier.

5. A reduction gear transmission as set forth in claim 1, wherein
the support shaft comprises an expanded portion at which the diameter of the support shaft is expanded, wherein the support shaft is partially composed of the expanded portion along its axial direction, and
the bearing mechanism comprises a pair of bearings, wherein the expanded portion is disposed between the pair of bearings.

6. A reduction gear transmission as set forth in claim 5, wherein the pair of bearings is a pair of tapered roller bearings.

* * * * *